United States Patent Office 3,498,276
Patented Mar. 3, 1970

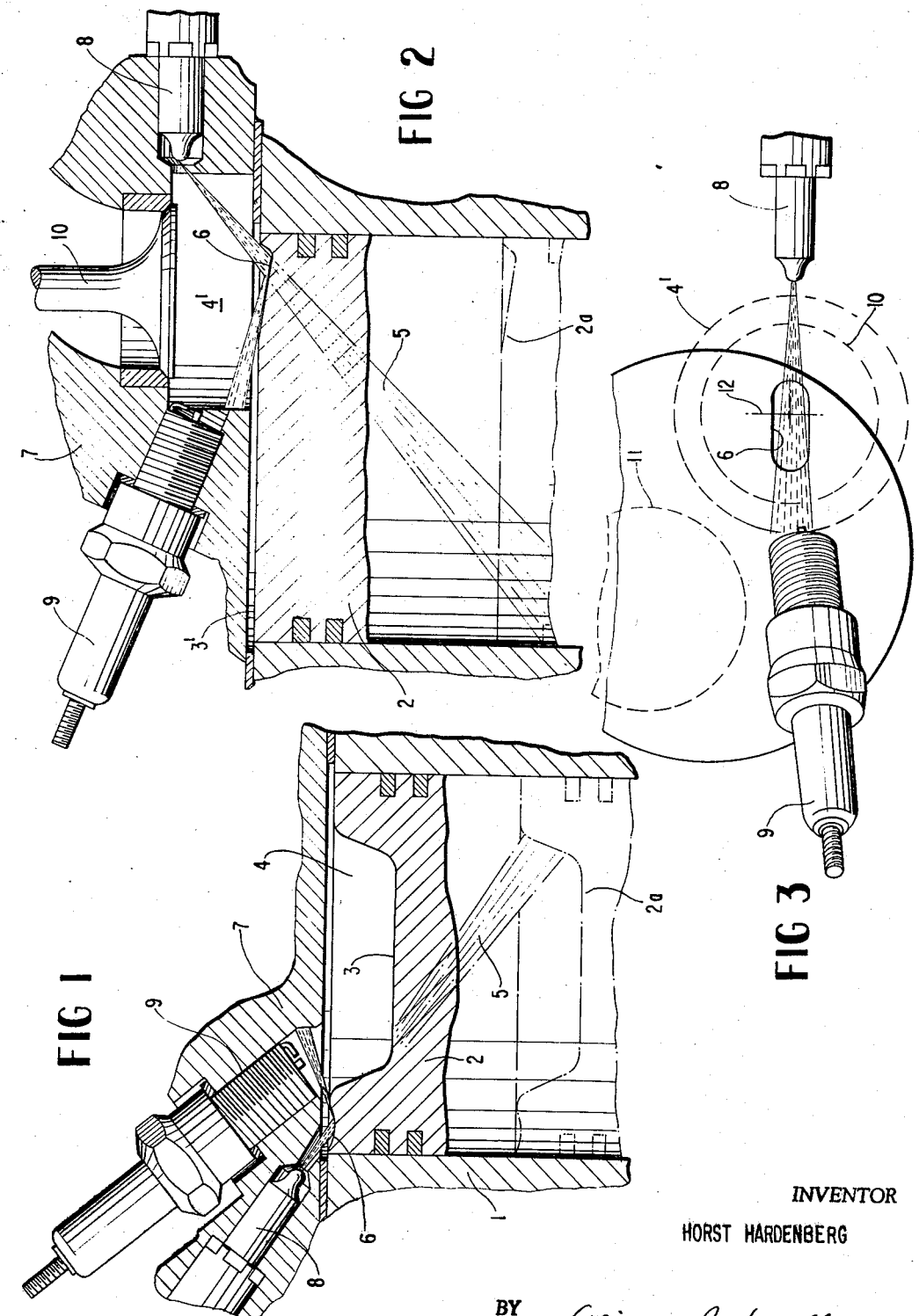

3,498,276
INJECTION-TYPE INTERNAL COMBUSTION ENGINE
Horst Hardenberg, Stuttgart-Unterturkheim, Germany, assignor to Daimler-Benz Aktiengesellschaft, Stuttgart-Unterturkheim, Germany
Filed Sept. 14, 1967, Ser. No. 667,770
Claims priority, application Germany, Sept. 15, 1966, D 51,104
Int. Cl. F02b 3/02; F02m 61/16
U.S. Cl. 123—32                           4 Claims

ABSTRACT OF THE DISCLOSURE

A process and apparatus for the injection of fuel into the combustion space of an externally controlled internal combustion engine of the injection type in which the last part of the injected fuel is deflected in the direction toward the ignition source, preferably by a groove provided in the piston top at such place as intersects the injected fuel jet portion just prior to the end of the injection and deflects the same toward the ignition source.

BACKGROUND OF THE INVENTION

The present invention relates to a process for the injection of an adjustable fuel quantity into the compression stroke of an externally controlled internal combustion engine and for the mixing of the injected fuel with the combustion air whereby the injection beginning is advanced with an increasing fuel quantity, as well as to an internal combustion engine for carrying out the process.

With the direct injection of the fuel in externally controlled internal combustion engines, it is important that at the instant of ignition an ignitable fuel-air mixture is always present at the ignition source independently of the load and of the rotational speed and therewith of the injected fuel quantity. However, difficulties are still encountered to date to assure the proper and correct mixture required at the ignition source independently of the quite different load conditions.

SUMMARY OF THE INVENTION

The present invention aims at eliminating the aforementioned shortcomings and in particular to supply the fuel into the combustion space in such a manner that a quantity of ignitable mixture, which remains practically constant, is always provided at the ignition source whereas the remaining fuel quantity, which in its quantity corresponds to the load, is distributed in the combustion space.

The underlying problems are solved according to the present invention essentially in that the last part of the fuel, which is initially injected into the combustion space in a customary manner, is deflected in the direction toward the ignition source.

It is achieved by such an injection that the fuel quantity supplied to the ignition source remains constant independently of the load by reason of the essentially constant difference in crankshaft angle between the beginning of the deflection and the injection end. The quantity of fuel supplied to the ignition source can thereby be chosen at will by a corresponding displacement of the injection end or a corresponding selection of the position of the associated deflection device.

According to a preferred embodiment of the process according to the present invention, the instant of the injection end is kept constant independently of the injection quantity or is adjusted exclusively in dependence on the rotational speed. However, if the more simple arrangement of maintaining the injection end completely constant is not satisfactory, then the presently customary displacement in dependence on the rotational speed of the injection time space may be utilized though to a preferably reduced extent.

According to a further feature of the present invention, the combustion air is supplied into the working cylinder rotating or swirling about the cylinder or combustion space axis in any conventional manner whereby the redetachment of the fuel, which is injected against the piston surface, as fuel vapor and the mixing and combustion thereof with the combustion air is accelerated.

Accordingly, it is an object of the present invention to provide a process and apparatus for the injection of fuel in externally controlled internal combustion engines which effectively avoids, by simple means, the aforementioned shortcomings and drawbacks encountered in the prior art.

Another object of the present invention resides in a process and apparatus for controlling the injection of fuel in externally controlled internal combustion engines which assures at all times an ignitable fuel-air mixture within the area of the ignition source at the instant of ignition.

Still a further object of the present invention resides in an externally controlled internal combustion engine of the injection type in which the correct mixture is available at all times independently of the prevailing load.

Another object of the present invention resides in a process and apparatus for injecting fuel into externally controlled internal combustion engines in which the mixing and combustion of the fuel with the combustion air is accelerated.

These and further objects, features, and advantages of the present invention will become more obvious from the following description when taken in connection with the accompanying drawing which shows, for purposes of illustration only, two embodiments in accordance with the present invention, and wherein:

FIGURE 1 is a schematic axial partial cross-sectional view through a working cylinder of a first embodiment of an internal combustion engine appropriate for carrying out the process according to the present invention;

FIGURE 2 is a schematic axial partial cross-sectional view through the working cylinder of a second embodiment of an internal combustion engine suitable for carrying out the process according to the present invention; and FIGURE 3 is a schematic plan view on the injection arrangement of FIGURE 2.

Referring now to the drawing wherein like reference numerals are used throughout the various views to designate like parts, and more particularly to FIGURE 1, the internal combustion engine illustrated therein includes in its working cylinder 1 a piston 2 which essentially accommodates in an approximately dish-shaped axial piston recess 3 the combustion space 4. The piston 2 is further provided about the piston recess 3 with an essentially flat, annularly shaped top surface in which is provided an approximately radially extending groove 6 at a place which reaches during the last phase of the compression stroke of the piston 2 the area of an injection jet 5. The fuel jet 5 may be injected from a fuel-injection nozzle 8 arranged at an edge place of the cylinder head 7 whereas a spark plug 9 is arranged above the injection nozzle 8 within the cylinder head 7.

Within its area facing the injection nozzle 8 the groove 6 is approximately matched in its direction and width (see also FIGURE 3) to the normal jet direction and the jet width of the injection jet 5 existing thereat whereas within the area thereof opposite the injection nozzle 8 the bottom of the groove 6 is deflected toward the spark plug 7.

During the operation of the described internal combustion engine, the injection nozzle 8 begins to inject under maximum load when the piston 2 is in the lower position illustrated in FIGURE 1 in dash and dot lines and designated therein by reference numeral 2a. Shortly before the termination of the injection, the piston 2 has reached the upper position illustrated in FIGURE 1, in which in its groove 6 now reaches the area of the fuel jet 5 and deflects the last-injected portion of the fuel jet in the illustrated manner toward the spark plug 9. It should also be noted that the deflection of the jet is additionally assisted by the squeeze flow of the air displaced out of the space between piston bottom and cylinder head 7.

In the internal combustion engine corresponding to the second embodiment and illustrated in FIGURES 2 and 3, in which the same parts are designated with similar reference numerals as in FIGURE 1, the combustion space 4' essentially consists of a cylindrical recess formed below a valve 10 arranged recessed in the cylinder head 7; the injection nozzle 8 is arranged at an edge place of the cylindrical recess forming the combustion space 4' and located approximately opposite the piston center while the spark plug 9 is arranged at an edge place of the cylindrical combustion space recess disposed approximately diametrically opposite the edge place of the injection nozzle 8 and at the same time approximately adjacent a second valve 11. The piston 2 which, as to the rest, is provided with an essentially flat top 3', is provided with the groove 6 also at a place which reaches the area of the injection jet 5 in the upper piston position as illustrated in FIGURE 2. Also in this embodiment, the fuel jet is finally deflected, as can be seen from FIGURE 2, toward the spark plug 9 by the curvature of the bottom of the groove 6 whose axis of curvature 12 is indicated in FIGURE 3 in dash and dot lines.

While I have shown and described two embodiments in accordance with the present invention, it is understood that the same is not limited thereto but is susceptible of numerous changes and modifications as known to a person skilled in the art. For example, in lieu of a spark plug, a glow plug could also be used as ignition source, and the combustion air could be supplied into the working cylinder 2 rotating about the cylinder axis or about the combustion space axis by any known means for the further improvement of the mixture preparation and especially for the re-detachment of the applied fuel from the piston recess 3 or the piston bottom 3' as fuel vapor, without affecting the present invention. Consequently, I do not wish to be limited to the details shown and described herein but intend to cover all such changes and modifications as are within the scope of those skilled in the art.

I claim:
1. In an externally-controlled internal combustion engine of the fuel injection type, having an engine block provided with cylinder head means, cylinder bore means and piston means mounted for reciprocal motion therein, combustion space means defined by said cylinder head means and the top of said piston means, ignition source means within said combustion space means, and injection nozzle means arranged eccentrically to the center of the combustion space means for injecting an adjustable quantity of fuel thereto during the compression stroke of the engine, the injection being effected in a stream including a long free jet at the beginning and extending into the cylinder bore means inclined to the axis thereof, wherein the initiation of ignition is advanced with an increase in fuel injection quantity, the improvement comprising:
 means for deflecting component parts of the injected fuel toward said ignition source means, including a groove substantially corresponding in direction and width to that of said injection stream, said groove being located in the region of the rim of the top of said piston means such that it intercepts the injection stream when the piston means is in the top dead center position, the bottom of the groove being directed toward said ignition source means such that the last portion of the fuel injected is deflected in the direction thereof.

2. The improvement according to claim 1, wherein the timing of the end of the ignition is maintained substantially constant despite variations in the quantity of fuel injected.

3. The improvement according to claim 2, wherein said combustion space means is provided in the form of an axial recess within the top of said piston means, said groove being provided in the annular portion of the top of said piston means radially outwardly of said combustion space means, and wherein said injection nozzle means is arranged radially outwardly of said groove and said ignition source means is disposed radially inwardly of said groove in proximity to said injection nozzle means.

4. The improvement according to claim 2, wherein said combustion space means is provided in the form of a recess within said cylinder head means, said groove being provided in the outer portion of the substantially planar top surface of said piston means, and wherein said injection nozzle means is disposed in said cylinder head means at a rim portion of said combustion space means and said ignition source means is disposed at a rim portion of said combustion space means approximately diametrically opposite said injection nozzle means.

References Cited

UNITED STATES PATENTS

| | | | |
|---|---|---|---|
| 2,724,371 | 11/1955 | Mallory | 123—32 |
| 2,742,025 | 4/1956 | Knolle et al. | 123—32 |
| 2,779,319 | 1/1957 | Goschel | 123—32 |
| 2,779,320 | 1/1957 | Goschel et al. | 123—32 |
| 2,995,121 | 8/1961 | Meurer | 123—32 |
| 3,079,901 | 3/1963 | Hallberg | 123—32 |
| 3,107,658 | 10/1963 | Meurer | 123—32 |
| 3,195,519 | 7/1965 | Bishop et al. | 123—32 |
| 3,195,520 | 7/1965 | Simko | 123—32 |
| 3,244,159 | 4/1966 | Meurer | 123—32 |

LAURENCE M. GOODRIDGE, Primary Examiner